United States Patent [19]
Epp et al.

[11] Patent Number: 6,063,515
[45] Date of Patent: May 16, 2000

[54] INTEGRATED FUEL CELL ELECTRIC POWER GENERATION SYSTEM FOR SUBMARINE APPLICATIONS

[75] Inventors: Danny G. Epp, Tsawwassen, Canada; Robert M. Baumert, San Diego, Calif.

[73] Assignee: Ballard Power Systems Inc., Burnaby, Canada

[21] Appl. No.: 08/996,101

[22] Filed: Dec. 22, 1997

[51] Int. Cl.⁷ .............................. H01M 8/04; H01M 8/06
[52] U.S. Cl. ............................... 429/17; 429/20; 429/24; 429/26
[58] Field of Search ................. 429/13, 17, 19, 429/20, 22, 24, 25, 26

[56] References Cited

U.S. PATENT DOCUMENTS

| | | |
|---|---|---|
| 3,748,180 | 7/1973 | Clausi et al. . |
| 4,098,960 | 7/1978 | Gagnon .................................. 429/25 |
| 4,670,359 | 6/1987 | Beshty et al. ............................ 429/17 |
| 4,943,493 | 7/1990 | Vartanian ................................. 429/17 |
| 5,006,425 | 4/1991 | Takabayashi ............................ 429/23 |
| 5,108,724 | 4/1992 | Buxbaum .............................. 423/248 |
| 5,141,823 | 8/1992 | Wright et al. ............................ 429/19 |
| 5,215,729 | 6/1993 | Buxbaum .............................. 423/248 |
| 5,217,506 | 6/1993 | Edlund et al. ............................. 55/16 |
| 5,259,870 | 11/1993 | Edlund ........................................ 95/56 |
| 5,401,589 | 3/1995 | Palmer et al. ............................ 429/13 |
| 5,645,626 | 7/1997 | Edlund et al. .............................. 95/56 |
| 5,676,911 | 10/1997 | Baumert et al. ....................... 422/200 |
| 5,714,276 | 2/1998 | Okamoto et al. ........................ 429/17 |

FOREIGN PATENT DOCUMENTS

| | | |
|---|---|---|
| 2242562 | 2/1991 | United Kingdom . |
| 2242563 | 2/1991 | United Kingdom . |

OTHER PUBLICATIONS

"Hydrogen–Generating Plant Based on Methanol Decomposition", Fuel Cell Systems, pp. 318–331, Heffner et al., Apr. 1964.

"Internal Voltage Control of Hydrogen–Oxygen Fuel Cells—Feasibility Study", NASA Technical Note, No. TN D–7956, Prokopius, Apr. 1975.

"The HDW Fuel Cell Plant", Undersea Defence Technology Conference, Jun. 1993.

"Canadian Naval Fuel Cell Applications—An Update", 1994 Fuel Cell Seminar, San Diego, California, Adams, Nov. 1994.

"The Development of a Submarine Power Plant Based on a Methanol Fuelled Proton Exchange Membrane Fuel Cell", 2$^{nd}$ International Fuel Cell Conference, Kobe, Japan, Clarkin et al., Feb. 1996.

"The Development of a 40 KW Proton Exchange Membrane Fuel Cell Submarine Power Plant Demonstration", Int'l Symposium on Naval Submarines 5, London, England, Clarkin et al., Jun. 1996.

*Primary Examiner*—Maria Nuzzolillo
*Assistant Examiner*—Jonathan Crepeau
*Attorney, Agent, or Firm*—McAndrews, Held & Malloy, Ltd.

[57] ABSTRACT

An integrated electrochemical fuel cell power plant, including a fuel processing subsystem is suitable for use in a submarine. Selection and control of operating temperatures and pressures in the various subsystems and components of the fuel cell power plant are important aspects of submarine power plant design. A catalytic burner is used to heat a heat transfer fluid, which in turn is used to heat a vaporizer and reformer in the fuel processing subsystem. A hydrogen separator is used to obtain a substantially pure hydrogen fuel stream from the reformate stream, which is directed to and recirculated through the fuel cell stack in a closed-loop. The fuel processor is operated at high pressure which facilitates the discharge of waste exhaust streams overboard, and the fuel cell is operated at a substantially lower pressure.

1 Claim, 3 Drawing Sheets

INTEGRATED FUEL CELL ELECTRIC POWER GENERATION SYSTEM FOR SUBMARINE APPLICATIONS

FIELD OF THE INVENTION

The present invention relates to electrochemical fuel cell electric power generation systems. More particularly, the present invention relates to an integrated electrochemical fuel cell power plant suitable for use in submarines.

BACKGROUND OF THE INVENTION

Electrochemical fuel cells electrochemically convert a fuel and an oxidant to produce electric power. A fuel cell includes an anode, a cathode and an electrolyte. Fuel- and oxidant-containing reactant streams are supplied to the anode and cathode of the fuel cell, respectively, in order for it to produce electric power.

In electrochemical fuel cells employing hydrogen as the fuel and oxygen as the oxidant, the catalyzed reaction at the anode produces hydrogen cations (protons) from the fuel supply. In solid polymer fuel cells an ion exchange membrane electrolyte facilitates the migration of protons from the anode to the cathode. In addition to conducting protons, the membrane isolates the hydrogen-containing fuel stream from the oxidant stream. At the cathode, protons that have crossed the membrane react with oxygen to form water as the reaction product.

The anode and cathode reactions in such fuel cells are shown in equations (1) and (2) below:

anode reaction $H_2 \rightarrow 2H^+ + 2e$  (1) 

cathode reaction $\tfrac{1}{2}O_2 + 2H^+ + 2e^- \rightarrow H_2O$  (2) 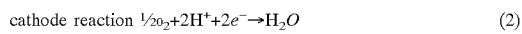

Two or more fuel cells may be electrically connected typically in series, or sometimes in parallel, in fuel cell stacks to increase the overall power output of the assembly. The stack typically includes feed manifolds or inlets for directing the fuel (a hydrogen-containing gas stream) and the oxidant (an oxygen-containing gas stream) to the anode and cathode of the individual fuel cells. The stack also generally includes exhaust manifolds or outlets for expelling the fuel and oxidant streams, each carrying product water.

Fuel cell power plants are of particular significance in the submarine industry, as they offer significant advantages relative to conventional diesel-electric and nuclear power plants often used in submarines. Fuel cell power plants offer high energy conversion efficiency and operate quietly, thereby limiting the opportunity for detection of the acoustic signature of the vessel. Air independent submarine propulsion systems, with on-board storage of fuel and oxidant, avoid the need for snorting periods (drawing air from above the ocean surface) during a mission, reducing the optical and radar signature of the vessel. The fuel cell propulsion system requires less on-board oxygen and fuel storage for a given mission than other air independent propulsion systems because of the high efficiency of the fuel cell as an energy conversion device. Fuel cell powered submarines therefore offer the advantage of long submerged mission durations. Also, relative to nuclear power plants, fuel cell power plants have fewer human health and safety concerns, particularly as to fuel storage and handling.

In submarine applications, one or more fuel cell stacks may be connected in series or, more commonly, in parallel with a conventional battery bank. Individual fuel cells and stacks are electrically connected to meet the desired voltage and current requirements of the system. The fuel cell may be used as the primary source of power for submarine propulsion and for other loads on board, and for charging the batteries. The battery may be used to augment the fuel cell stack power output when power in excess of the maximum fuel cell output is required.

In fuel cell power plants, such as those used to power submarines, the fuel cell stack may be supplied with an oxidant stream composed of substantially pure oxygen or oxygen in a carrier gas such as nitrogen. The oxygen may be stored on-board the submarine as liquid oxygen ("LOX"), or may be generated on-board by decomposition of an oxygen source such as hydrogen peroxide. In some instances, the fuel cell power plant may be adapted to use air as the oxidant stream during surface operations, thereby reserving the stored oxygen supply for operation during submersion.

The fuel stream in such systems is often substantially pure hydrogen obtained by purification of a hydrogen-containing reformate stream generated by the on-board catalytic steam reformation of a process fuel stream such as methanol, kerosene, diesel and other alcohols or hydrocarbon-based fuels. In other systems, hydrogen storage devices, such as metal hydrides or high pressure gas cylinders are used to store hydrogen fuel on-board, as well as or instead of an on-board reformer.

To be effectively employed in submarine applications, fuel processing components such as vaporizers, reformers and hydrogen separators should be compact, robust and reliable. Examples of radial flow fuel vaporizer and reformer designs are disclosed in U.S. Pat. No. 5,676,911 which is incorporated herein by reference in its entirety.

Diffusion membrane hydrogen separators, such as palladium or palladium alloy membrane separators, are particularly suitable for use in reformate stream purification on a submarine since they are compact and their operation is not affected by the motion of the vessel. They generally separate the reformate stream into a high purity hydrogen stream and a raffinate stream, which is depleted in hydrogen and contains other reformate stream components, primarily carbon dioxide. The substantially pure hydrogen stream is then delivered to the fuel cell stack as the fuel stream.

A conventional palladium alloy-based hydrogen separation device includes an arrangement of thin-walled palladium alloy tubular members sealed in a shell (similar to a conventional shell-and-tube heat exchanger). In operation, a hydrogen-containing reformate gas stream is fed to one side of the tubular member. The hydrogen selectively diffuses through the palladium alloy material, thereby creating a stream of substantially pure hydrogen gas on one side of the tubular member and a raffinate stream on the other side. While these shell-and-tube separators are useful in providing a substantially pure hydrogen stream, such separators tend to be bulky and costly. In addition, the interface between the palladium alloy tubular members and the separator shell are prone to leakage and other breaches, particularly at high differential pressures.

A variety of non-conventional approaches to metal diffusion membrane separator design may be used as alternatives to the shell-and-tube configuration mentioned above. These include composite noble metal tubes, thin film metal deposition on porous substrates, or supported rolled film designs. In these designs the metal or metal alloy film thickness is drastically reduced compared to conventional palladium alloy tubes, reducing the cost of the unit for a given capacity of gas separation. Structural strength in these designs is provided by a less expensive hydrogen permeable support material, while the thin, supported metal or metal alloy film provides hydrogen selectivity. Examples of such designs are described in Edlund et al. U.S. Pat. No. 5,645,626 and related patents, and in Buxbaum U.S. Pat. Nos. 5,108,724 and 5,215,729.

Selection and control of operating temperatures and pressures in the various subsystems and components of the fuel cell power plant are important aspects of submarine fuel cell power plant design. In particular, control of the temperature in the catalytic reformer is important if efficient conversion without catalyst damage is to be achieved. Direct heating of the reformer by combustion gases may lead to hot spots in the reformer and sintering of the catalyst. In the present approach, a catalytic burner is used to heat a heat transfer fluid, which in turn is used to heat the vaporizer and reformer. The heat transfer fluid provides a thermal buffer between the catalytic burner gases and the vaporizer and reformer, and may be used to deliver large amounts of heat over a narrow temperature range, reducing the risk of catalyst damage. Relative to conventional flame burners, catalytic burners are generally safer, and result in more complete combustion of the reactants. Further, because they operate at a lower reactant gas concentration, the temperature is more readily controlled.

In selecting preferred operating pressures for the fuel cells and for the reactant supply and processing systems, factors such as the need to be able to discharge waste exhaust streams overboard at diving depth pressure should be considered. One approach is to operate the entire fuel cell power generating system, including the fuel processing system and fuel cells, at a pressure higher than the typical maximum depth pressure so that waste exhaust streams may be discharged without the need for further pumping. This is the preferred option when the fuel cell is operating on a dilute or impure fuel stream, and there is not a closed fuel loop for recirculating the fuel stream through the fuel cell stack. In this case the fuel stream exiting the stack must be vented or discharged from the stack, and ultimately from the vessel, so preferably it is at high pressure.

If the subsystems generating waste exhaust streams are operating at lower pressures than depth pressure, the exhaust gases must be compressed prior to discharge to the ocean, be it directly or via a scrubber. Compressing exhaust streams for discharge overboard represents a significant parasitic power load and requires the use, storage and maintenance of additional equipment.

In the present approach, the fuel cell is operated at low pressure (for example, below 100 psia) on a substantially pure fuel stream, and the vaporizer and reformer are operable at high pressure (higher than typical depth pressures, for example, 400–600 psia). It is preferable to operate the fuel cell at lower pressure for reduced system complexity and improved safety. The use of a substantially pure fuel stream means that the fuel stream can be recirculated through the fuel cell stack in a closed-loop system. Therefore in normal operation there is no fuel exhaust stream from the stack to be discharged overboard so low pressure operation of the stack is not a problem. The high operating pressure capability of the fuel processing system means that the exhaust gas therefrom is generally at a sufficiently high pressure for discharge directly overboard or via a scrubber, without the need to increase the pressure.

This approach requires the hydrogen separation membrane to be operable with a high differential (transmembrane) pressure across it, such that on one side it is fed with a reformate stream at a pressure approximately equal to the operating pressure of the fuel processor, and the hydrogen stream on the other side is at the preferred fuel stream inlet pressure for the fuel cell.

SUMMARY OF THE INVENTION

In a first embodiment of a method of operating a fuel cell electric power generation system for a submarine, the system comprising a solid polymer fuel cell stack for producing electrical power, the method comprises:

(1) vaporizing a process fluid stream in a vaporizer to produce a vaporizer outlet stream;

(2) catalytically reforming the vaporizer outlet stream in a reformer to produce a reformate stream comprising hydrogen and carbon dioxide;

(3) separating the reformate stream in a hydrogen separator into a fuel stream of substantially pure hydrogen, and a raffinate stream consisting of a hydrogen-depleted reformate stream;

(4) supplying the fuel stream and an oxidant stream to the fuel cell stack;

(5) circulating a heat transfer fluid to heat the vaporizer and the reformer;

(6) heating the heat transfer fluid using a catalytic burner, the burner having a quantity of catalyst disposed therein for promoting combustion of a burner fuel inlet stream with a burner oxidant inlet stream to produce heat and a burner outlet stream.

The oxidant stream supplied to the fuel cell stack preferably comprises oxygen from a liquid oxygen supply. The burner oxidant inlet stream preferably also comprises oxygen drawn from the liquid oxygen supply. The process fluid stream directed to the vaporizer preferably comprises a methanol-water mixture. Optionally, product water generated by the operation of the fuel cell stack may be used in the methanol-water mixture. The methanol and water may be pre-mixed before being directed to the vaporizer, or may be mixed in the vaporizer, or the methanol and water may be vaporized separately and then directed to the reformer. The burner fuel inlet stream preferably comprises the raffinate stream from the hydrogen separator and some methanol.

Temperature control of the catalytic burner is facilitated if a portion of the burner outlet stream is recirculated through the burner. Preferably the operating temperature of the burner is monitored using a temperature sensor, and the portion of the burner outlet stream which is recirculated through the catalytic burner is adjusted in response to an output of the temperature sensor to maintain the burner temperature in the desired operating range. To conserve oxygen while ensuring complete combustion in the catalytic burner, it may also be advantageous to monitor the oxygen concentration in the burner outlet stream using a sensor, and adjust the rate of supply of the burner oxidant inlet stream to the catalytic burner responsive to an output of the oxygen concentration sensor. Preferably, in this way the oxygen concentration in the burner outlet stream is maintained substantially constant.

The burner outlet stream, which contains a high concentration of carbon dioxide, is directed to a scrubber in which it is dissolved in seawater and discharged from the submarine.

In a first embodiment, a fuel cell electric power generation system for a submarine comprises:

(a) a fuel cell stack for producing electrical power, the stack comprising a fuel stream inlet, an oxidant stream inlet and a plurality of solid polymer fuel cells for promoting electrochemical reaction of a fuel stream introduced at the fuel stream inlet with an oxidant stream introduced at the oxidant stream inlet;

(b) a fuel processing subsystem for generating the fuel stream, the subsystem comprising a process fluid stream inlet, a fuel stream outlet fluidly connected to the fuel stream inlet of the fuel cell stack, and an exhaust stream outlet, the subsystem further comprising:
  (1) a vaporizer for vaporizing a process fluid stream introduced at the process fluid stream inlet, to produce a vaporizer outlet stream;
  (2) a catalytic reformer for catalytically converting the vaporizer outlet stream to produce a reformate stream comprising hydrogen and carbon dioxide;
  (3) a reformate stream purification system comprising a hydrogen separator for separating the reformate stream to produce the fuel stream of substantially pure hydrogen, and a raffinate stream consisting of a hydrogen-depleted reformate stream;
  (4) a heat transfer fluid reservoir containing a heat transfer fluid;
  (5) a catalytic burner for heating the heat transfer fluid, the burner having a quantity of combustion catalyst disposed therein, and comprising a burner fuel stream inlet, a burner oxidant stream inlet and a burner stream outlet; and
  (6) a heat transfer fluid circulation system comprising a recirculation pump and a heat transfer fluid conduit extending from the reservoir for directing the heat transfer fluid to and from each of the vaporizer and the reformer.

Preferably the system further comprises a liquid oxygen storage vessel fluidly connected to the oxidant stream inlet of the fuel cell stack, and a source of methanol and water fluidly connected the process fluid stream inlet of the fuel processing subsystem.

The burner oxidant stream inlet may also be fluidly connected to the liquid oxygen storage vessel, and the burner fuel stream inlet may be fluidly connected to the source of methanol as well as being fluidly connected to receive the raffinate stream from the hydrogen separator. The burner stream outlet is fluidly connected to direct at least a portion of a burner outlet stream to the exhaust stream outlet of the fuel processing subsystem, from which it is preferably directed to a scrubber for dissolving it in seawater. The exhaust stream outlet of the scrubber is fluidly connected to a discharge stream outlet, for discharging the dissolved stream overboard. Preferably there is an oxygen concentration sensor disposed for monitoring the oxygen concentration of the burner outlet stream.

Preferred heat transfer fluids include thermal oils, such as hydrocarbon-based or synthetic silicon-based oils.

In preferred embodiments of the system, the hydrogen separator comprises a supported thin film metal diffusion membrane, such as a palladium or palladium alloy membrane supported on a porous substrate.

In a second embodiment, a fuel cell electric power generation system for a submarine comprises:
  (a) a fuel cell stack for producing electrical power, the stack comprising a fuel stream inlet, an oxidant stream inlet and a plurality of solid polymer fuel cells for promoting an electrochemical reaction of a fuel stream introduced at the fuel stream inlet with an oxidant stream introduced at the oxidant stream inlet;
  (b) a fuel processing subsystem for generating the fuel stream, the subsystem comprising a process fluid stream inlet, a fuel stream outlet fluidly connected to the fuel stream inlet of the fuel cell stack, and an exhaust stream outlet, the subsystem further comprising:
    (1) a vaporizer for vaporizing a process fluid stream introduced at the process fluid stream inlet, to produce a vaporizer outlet stream;
    (2) a catalytic reformer for catalytically converting the vaporizer outlet stream to produce a reformate stream comprising hydrogen and carbon dioxide;
    (3) a reformate stream purification system comprising a membrane hydrogen separator for separating the reformate stream to produce the fuel stream of substantially pure hydrogen, and a raffinate stream consisting of a hydrogen-depleted reformate stream;
wherein the membrane hydrogen separator can tolerate a transmembrane pressure differential of greater than 300 psi, and preferably greater than 500 psi.

Preferred membrane hydrogen separators include supported thin film metal diffusion membrane separators, such as those with palladium or palladium alloy membranes supported on a porous substrate.

The use of a hydrogen separator to generate a substantially pure hydrogen fuel stream for the fuel cell stack permits the stack to be operated with a closed loop on the fuel side, wherein the fuel stream is recirculated through the fuel cell stack. A recirculator, such as, for example, a recirculation pump or an ejector are used for recirculating the fuel stream through the fuel cell stack. To control and maintain an adequate fuel stream pressure downstream of the hydrogen separator a pressure sensor is preferably used. A pressure regulator, disposed between the pressure sensor and the fuel stream closed-loop may be used to maintain a substantially constant pressure in the fuel stream closed-loop.

In a preferred method of operating such a fuel cell electric power generation system, the method comprises:
  (1) vaporizing a process fluid stream in a vaporizer to produce a vaporizer outlet stream;
  (2) catalytically reforming the vaporizer outlet stream in a reformer to produce a reformate stream at a pressure of greater than 400 psia comprising hydrogen and carbon dioxide;
  (3) separating the reformate stream, using a membrane hydrogen separator, into a fuel stream of substantially pure hydrogen at a pressure of less than 100 psia, and a raffinate stream consisting of a hydrogen-depleted reformate stream at a pressure of greater than 400 psia;
  (4) supplying the fuel stream and an oxidant stream to the fuel cell stack at a pressure of less than 100 psia.

The substantially pure hydrogen fuel stream is preferably recirculated through the fuel cell stack in a closed loop. A pressure sensor may be used to monitor the pressure downstream of the hydrogen separator and the rate of supply of the process fluid to the vaporizer may be adjusted responsive to an output of the pressure sensor. The process fluid stream preferably comprises methanol and water, which may be mixed at various stages as described above. Optionally, product water generated by the operation of the fuel cell stack may be used in the methanol-water mixture.

The oxidant stream preferably comprises a mixture of oxygen, from a liquid oxygen supply and nitrogen, which may also be recirculated through the fuel cell stack in a closed loop.

The method may further comprises the steps of:
  (5) circulating a heat transfer fluid to heat the vaporizer and the reformer;
  (6) heating the heat transfer fluid using a catalytic burner, the burner having a quantity of catalyst disposed therein for promoting combustion of a burner fuel inlet stream with a burner oxidant inlet stream to produce heat and a burner outlet stream.

Typically, at least a portion of the burner outlet stream is directed to a scrubber in which it is dissolved in seawater and discharged from the submarine.

DETAILED DESCRIPTION OF THE PREFERRED EMBODIMENT

Figure 1:
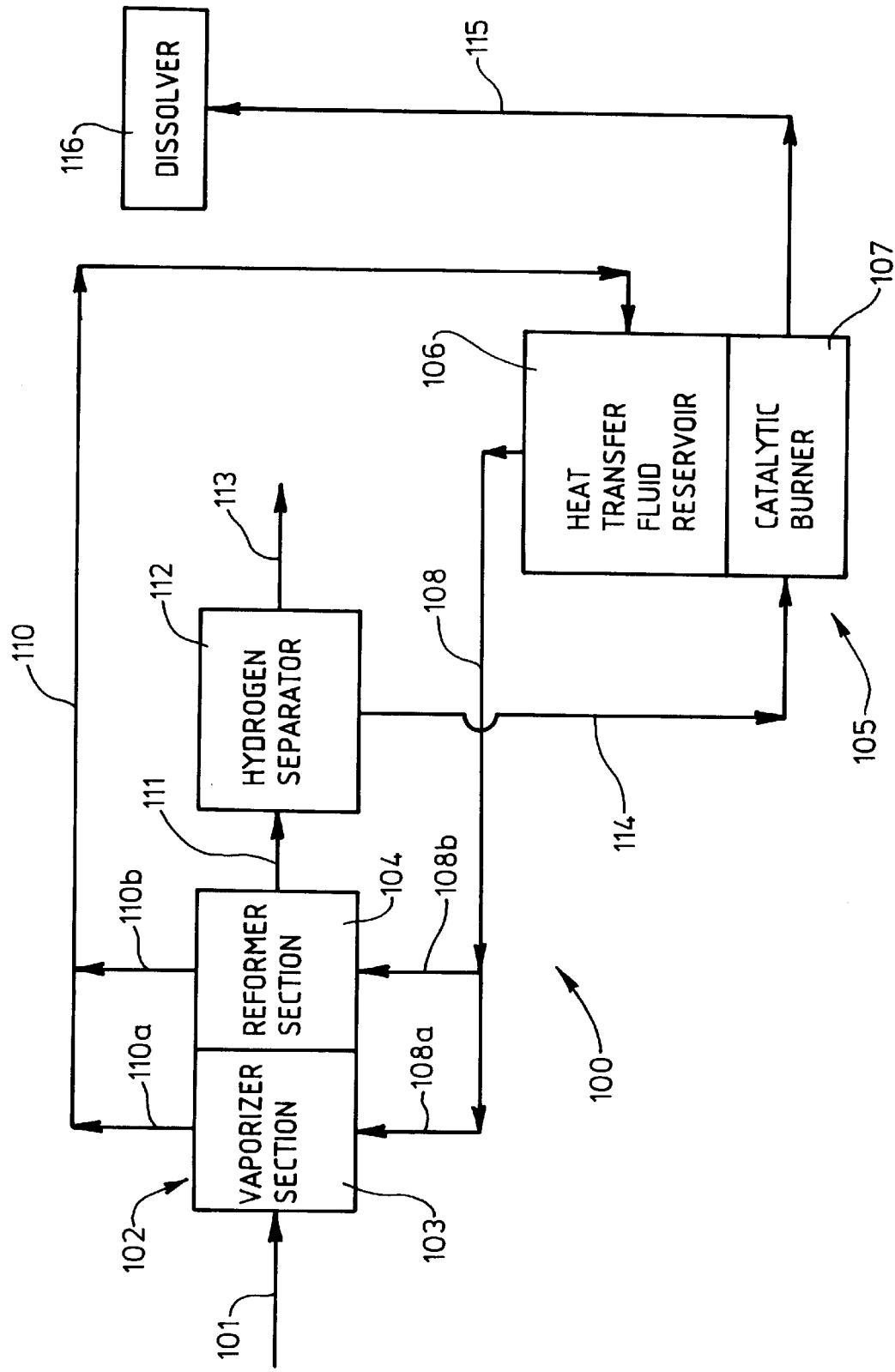
FIG. 1 is a schematic diagram of an embodiment of a fuel processing system for an integrated fuel cell electric power generation system.

Turning first to FIG. 1, an integrated fuel cell electric power generation system includes a fuel processing subsystem 100. Within fuel processing subsystem 100, process fluid stream 101, which preferably comprises a mixture of water and methanol, is directed to the vaporizer section 103 of fuel processor 102. In vaporizer section 103, the mixture of methanol and water is flash vaporized before being directed to the reformer section 104 of fuel processor 102. Reformer section 104 has disposed therein a quantity of reforming catalyst (not shown in FIG. 1) to promote the steam reformation process. In reformer section 104, the vaporized mixture of water and methanol is catalytically reformed into a hydrogen-rich gas mixture 111 (reformate stream) comprising hydrogen, carbon dioxide, carbon monoxide, water vapor and typically some unreacted methanol.

Vaporizer section 103 and reformer section 104 are heated by heat exchange with a heat transfer fluid stream 108 directed from heat transfer fluid heater 105. Heat transfer fluid heater 105 comprises a reservoir 106 and a catalytic burner 107. Catalytic burner 107 has disposed therein a quantity of combustion catalyst (not shown in FIG. 1) for promoting combustion of burner fuel and oxidant inlet streams. Heat transfer fluid streams 108a and 108b are directed to vaporizer section 103 and reformer section 104, respectively, from reservoir 106. Heat transfer fluid streams 108a and 108b impart heat within vaporizer section 103 and reformer section 104 to promote the respective vaporization and reformation processes. Heat transfer fluid outlet streams 110a and 110b are directed back to fluid reservoir 106 via merged stream 110. The heat transfer fluid is heated within the reservoir 106 through heat exchange with catalytic burner 107, and is then recirculated to the vaporizer and reformer sections as described above. Suitable heat transfer fluids include, but are not limited to thermal oils, such as, for example THERMINOL®, (THERMINOL® is a trademark of Monsanto).

Hydrogen-rich reformate stream 111 is directed from reformer section 104 of fuel processor 102 and to hydrogen separator 112. Hydrogen separator 112 comprises at least one hydrogen separation module comprising a separation membrane (not shown in FIG. 1) which selectively allows the diffusion of hydrogen therethrough. The hydrogen-rich reformate stream 111 contacts the hydrogen separation module, thereby separating the hydrogen component from the remaining components in the reformate stream 111. Hydrogen separator 112 thus produces a substantially pure hydrogen fuel stream 113 and a raffinate stream 114 typically comprising some hydrogen and the other components of reformate stream 111. Hydrogen fuel stream 113 is then supplied as the fuel stream to the fuel cell stack (not shown in FIG. 1). Hydrogen separator 112 is selected such that it is operable at relatively high differential transmembrane pressure, for example, exceeding 300 psi, and preferably exceeding 500 psi, as in operation the reformate stream 111 will preferably be at 400–600 psia and the hydrogen stream 113 will preferably be at less than 100 psia.

Raffinate stream 114 is directed to the catalytic burner 107 of heat transfer fluid heater 105 where it is a component of the burner fuel inlet stream for the catalytic burner 107. Accordingly, catalytic burner 107 also operates at pressures in the range of 400–600 psia and thus produces a high pressure burner outlet stream 115 comprising carbon dioxide. The catalytic burner outlet stream 115 is directed to a carbon dioxide dissolver 116, where it is dissolved in sea water at diving depth pressures, typically in the range of 400–600 psia. The ability of the catalytic burner to generate a carbon dioxide-containing outlet stream at relative high pressure eliminates the need for exhaust compression prior to scrubbing, thus avoiding the significant parasitic power load associated with some conventional submarine fuel cell power plants.

The preferred hydrogen separator for incorporation into the present integrated fuel cell electric power generation system is a supported thin film membrane, such as described in Edlund et al. U.S. Pat. No. 5,645,626 and related patents, which employs inexpensive support materials and is not susceptible to intermetallic diffusion problems. Suitable separators are available from Wah Chang, an Allegheny Teledyne Company, of Albany, Oreg., USA. Separators of this type are readily manifolded into large systems, and are robust to temperature and pressure fluctuations. Other types of supported hydrogen-selective membrane separation devices could be employed, including those with palladium alloys supported on ceramics or on other noble metals.

Figure 2:
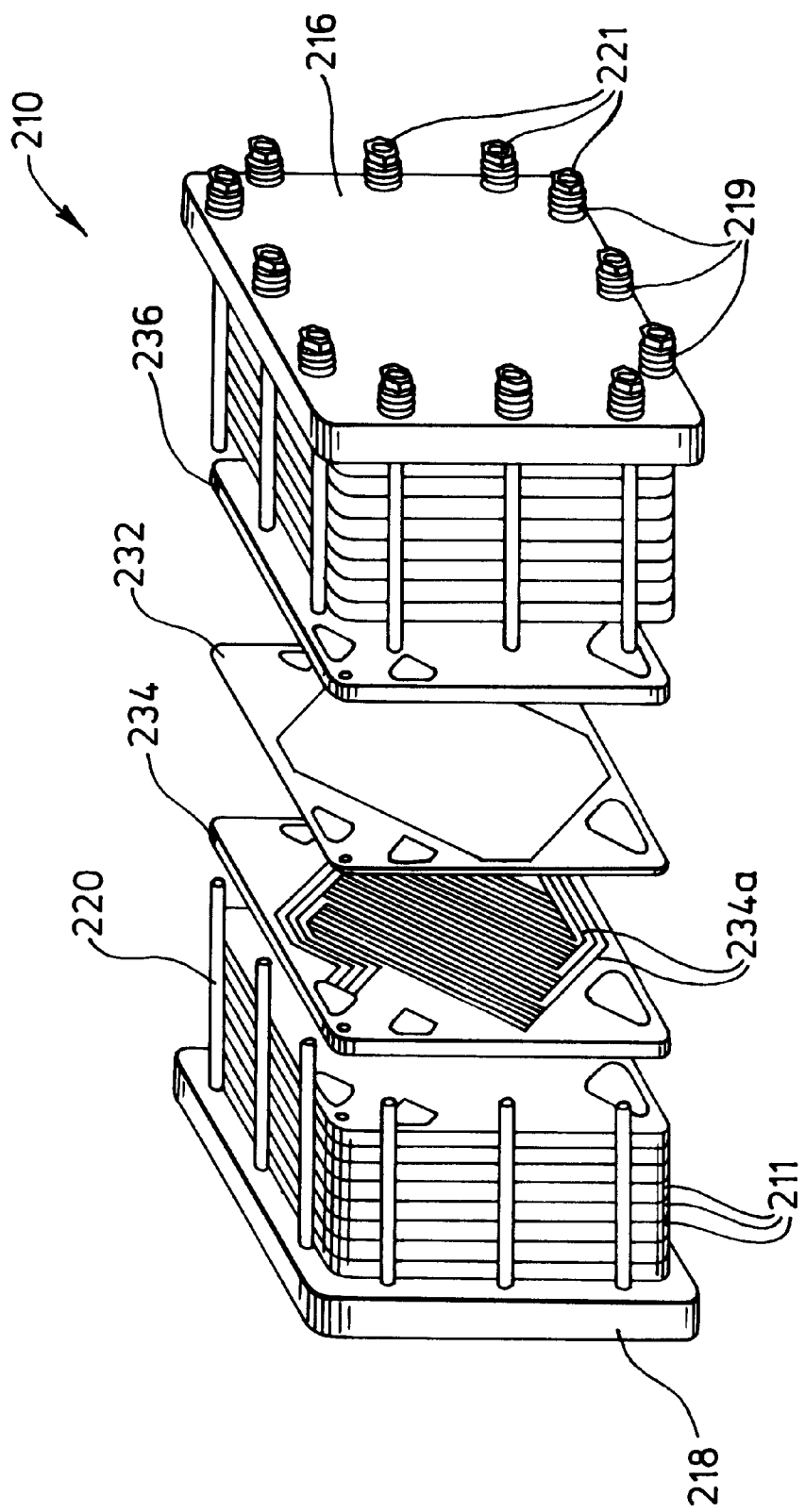
FIG. 2 is a partially exploded isometric view of a fuel cell stack.

Turning now to FIG. 2 a solid polymer fuel cell stack 210 includes a compression end plate assembly 216, a fluid end plate assembly 218, and a plurality of fuel cell assembly repeating units 211. Tie rods, one of which is illustrated in FIG. 2 as tie rod 220, extend between end plate assemblies 216 and 218 to retain and secure stack 210 in its compressed assembled state with springs 219 and fastening nuts 221. Fuel cell assemblies 211 include an anode separator plate 234, a cathode separator plate 236, and a membrane electrode assembly (MEA) 232 interposed between plates 234 and 236. Plate 234 has a plurality of fluid flow channels 234a formed in its major surface facing MEA 232 for directing a reactant in contact with an electrode of membrane electrode assembly 232. Reactant and coolant fluid streams are supplied to and exhausted from internal manifolds and passages in the stack 210 via inlet and outlet ports (not shown) in end plate 218.

Figure 3:
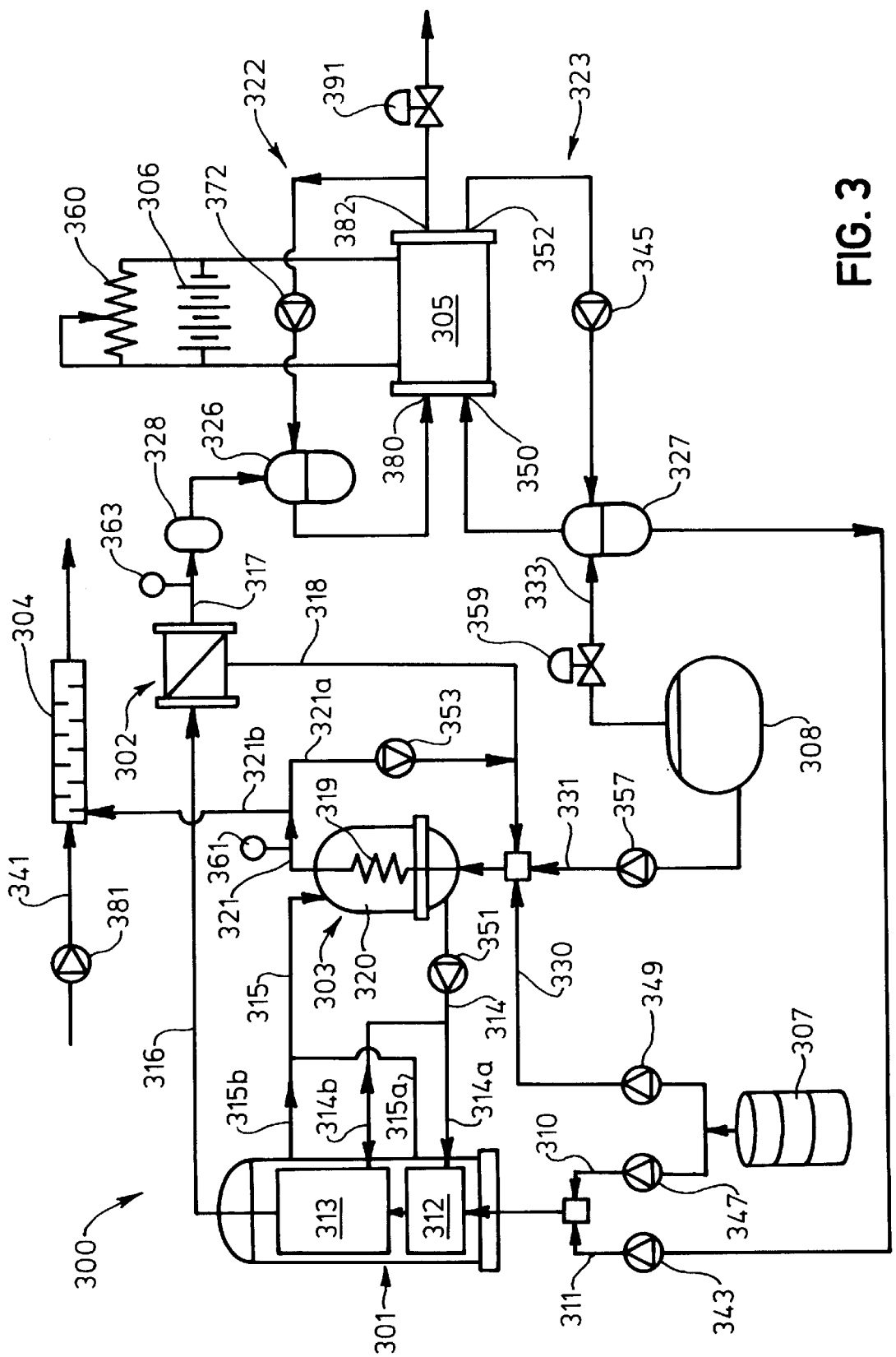
FIG. 3 is a schematic diagram of an embodiment of an integrated fuel cell electric power generation system for a submarine.

FIG. 3 schematically illustrates a preferred embodiment of an integrated fuel cell electric power generation system 300 for a submarine. Fuel cell electric power generation system 300 comprises a fuel processor 301 as described above, a hydrogen separator 302 as described above, a heat transfer fluid heater 303, a carbon dioxide dissolver 304, a fuel cell stack 305, a conventional battery 306 (optional), a methanol storage container 307, and a liquid oxygen (LOX) storage container 308. Fuel cell stack 305 may be an array comprising a plurality of fuel cell stacks; similarly, battery 306 is typically a bank of batteries.

Fuel processor 301 comprises vaporizer section 312 and reformer section 313. Methanol inlet stream 310 and water inlet stream 311 are directed to vaporizer section 312 of fuel processor 301. In operation, methanol and water inlet streams 310, 311 are pressurized by pumps 347, 343 respectively, to the preferred operating pressure of the fuel processor 301, that is preferably 400–600 pisa, and more preferably 500–600 psia. The operating pressure of the fuel processor 301 may be controlled by a pressure regulator (not shown) which is responsive to the depth pressure. The regulator may be set, for example, to maintain the pressure in a preferred high pressure range (such as 400–600 psia) even at substantially lower depth pressures, or at least at a minimum pressure which is preferred for operation of the hydrogen separator 302. The regulator may however be adjusted, for example, to maintain the operating pressure of the fuel processor 301 at a variable pressure which is a fixed amount higher than depth pressure, thus the fuel processor 301 may be operated at lower pressures than 400 psia at shallower depths.

Vaporizer section 312 and reformer section 313 are heated by heat exchange with a heat transfer fluid. Heat transfer fluid in stream 314 is directed, from the reservoir 320 of heat transfer fluid heater 303, to vaporizer section 312 via branched stream 314a and to reformer section 313 via branched stream 314b. The heat transfer fluid is circulated through vaporizer section 312 and reformer section 313 via heat exchange passageways (not shown in FIG. 3) within each of the vaporizer and reformer sections using heat transfer fluid pump 351. Heat transfer fluid outlet stream 315a is exhausted from vaporizer section 312 and heat transfer fluid outlet stream 315b is exhausted from reformer section 313. Streams 315a and 315b are recirculated back to reservoir 320 via merged stream 315. Note that the heat transfer fluid may be directed through the vaporizer and reformer sections one after the other in series, or in any preferred flow path configuration.

As shown in FIG. 3, hydrogen-rich reformate stream 316 is directed from the reformer section 313 of fuel processor 301 to hydrogen separator 302, where the reformate stream 316 is separated into a substantially pure hydrogen fuel stream 317 and a raffinate stream 318. Hydrogen separator 302 preferably comprises a supported thin film metal diffusion membrane of palladium or palladium alloy, as described above. In operation the reformate stream 316 entering the hydrogen separator 302 is at a pressure of 400–600, or more preferably 500–600 psia. The raffinate stream 318 is also at a pressure of 400–600 psia, or more preferably 500–600 psia, whereas the fuel stream 317 is at a pressure less than 100 psia, and preferably in the range of 40–80 psia.

At least a portion of raffinate stream 318, which comprises hydrogen, carbon dioxide, carbon monoxide, water vapor and methanol, is directed to the catalytic burner 319 of heat transfer fluid heater 303. Thus, catalytic burner 319 also operates at pressures of 400–600 psia, or more preferably 500–600 psia, and thus produces a high pressure burner outlet stream 321 which includes carbon dioxide. Catalytic burner 319 has disposed therein a catalyst (not shown), typically platinum-based, for promoting combustion of the burner fuel and oxidant inlet streams. Catalytic burner 319 heats the heat transfer fluid contained in reservoir 320 of heat transfer fluid heater 303. Optionally, an auxiliary methanol stream 330 may be drawn from methanol storage container 307 by a pump 349 and supplied as part of the burner fuel inlet stream to catalytic burner 319. Oxygen drawn from LOX storage container 308 is preferably employed as the oxidant source for burner oxidant inlet stream 331 directed to the catalytic burner 319. Typically the LOX is stored at a pressure of approximately 100 psia, and for delivery to catalytic burner 319 it is compressed to the burner operating pressure using a cryogenic pump 357. The speed of pump 357 is varied in response to the oxygen concentration in the burner outlet stream 321 which is determined by oxygen sensor 361. Preferably the oxygen concentration in the burner outlet stream 321 is maintained substantially constant, generally between 1–3%. A variable portion 321a of burner outlet stream 321 is recycled back to catalytic burner 319 via compressor 353, to adjust the combustion temperature within the burner. The speed of compressor 353 is controlled to vary the quantity of the burner outlet stream 321a which is recycled, in order to maintain the temperature of catalytic burner 319 within a desired operating range, typically 400–700° C. The remainder of burner outlet stream 321b is discharged via dissolver 304. The pressure of burner outlet stream 321 allows it to be readily dissolved in a seawater stream 341 directed through the dissolver 304 by a pump 381 at diving depths through the use of carbon dioxide dissolver 304 and without increasing the pressure of burner outlet stream 321 through a ramping-up process. A significant parasitic load associated with conventional submarine electrical power plants is thereby eliminated.

Substantially pure hydrogen fuel stream 317 in FIG. 3 is directed as the feed stream to a portion of fuel loop 322, and is circulated through the anodes (not shown in FIG. 3) of fuel cell stack 305 between fuel stream inlet 380 and fuel stream outlet 382 by compressor 372. Because the fuel stream is substantially pure hydrogen, it may be recirculated through the stack via loop 322 for prolonged operating periods without significant accumulation of inerts or impurities in the loop. However, purge valve 391 provides the facility to occasionally purge or bleed the fuel recirculation loop 322, for example, during surface operations. The vaporizer water and methanol stream pumps 343, 347, respectively, are controlled in response to the pressure of the substantially pure hydrogen fuel stream 317 exiting the separator 102, which is sensed by pressure sensor 363. Thus, the pressure of fuel inlet stream 317 is controlled and maintained within a desired range (preferably 40–80 psia) by controlling the rate of upstream delivery of water and methanol to fuel processor 301 by adjusting the speed of pumps 343, 347.

Fuel knock-out drum 326 is disposed within fuel loop 322 to condense and collect liquid water from the fuel stream. Optionally, a hydrogen accumulator 328 is interposed between hydrogen separator 302 and fuel loop 322 to store and deliver hydrogen to fuel loop 322 when the fuel output of hydrogen separator 302 is insufficient to meet the fuel demands of stack 305.

Oxidant loop 323 in FIG. 3 comprises oxygen as the oxidant in a carrier of inert nitrogen gas introduced from a nitrogen source (not shown in FIG. 3). An oxygen stream 333 is supplied from LOX storage container 308, the pressure being regulated down from the LOX storage pressure (approximately 100 psia) to the fuel cell operating pressure (typically 40–80 psia) using pressure regulating valve 359. The dilute oxygen stream is circulated by oxidant stream recirculation pump 345 through the cathodes (not shown in FIG. 3) of fuel cell stack 305 between the oxidant stream inlet 350 and oxidant stream outlet 352 in loop 323. Oxidant knock-out drum 327 is disposed within oxidant loop 323 to condense and collect liquid water (including product water produced by the electrochemical reaction within fuel cell stack 305) from the oxidant stream. Water collected in oxidant loop knock-out drum 327 is pressurized by a pump 343 and directed via water inlet stream 311 to the vaporizer section 312 of fuel processor 301. The water may also be used to humidify the oxidant stream. A purge valve (not shown) may also be provided on the oxidant loop 323 (similar to that described above for loop 322 with purge valve 391) to allow occasional purging or bleeding of the oxidant recirculation loop 323.

To control the voltage output of fuel cell stack 305, the concentration of oxygen in the oxygen-nitrogen mixture within oxidant loop 323 is varied in response to the demands of the electrical load 360. Loop 323 is preferably precharged with nitrogen to half the full power design pressure, to ensure that the oxygen concentration at full power is only 50%. A fixed quantity of nitrogen is thus recirculated, with varying partial pressures of oxygen. When the power demand of electrical load 360 exceeds the maximum power output of fuel cell stack 305, a parallel connected conventional battery 306 is employed within the circuit to meet the excess power demand.

The system illustrated in FIG. 3 may be modified to allow it operate on atmospheric air during surface operations, in addition to LOX which is used as the oxygen source when the submarine is submerged. This conserves the LOX supplies, and can reduce or eliminate the need to maintain on-board diesel generators and battery banks, thereby reducing the size and complexity of the submarine power plant. The atmospheric air could, for example, be compressed using a turbo-compressor mechanically connected to a turbo-expander, which in turn would receive energy from the burner outlet stream. In this mode of operation, compressed atmospheric air would be directed to the fuel cell stack. The oxygen-depleted oxidant exhaust stream from the fuel cell stack would be directed to the catalytic burner inlet (not recirculated through the stack), and the burner outlet stream would be discharged to the atmosphere via the turbo-expander.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. A method of operating a fuel cell electric power generation system for a submarine, said system comprising a solid polymer fuel cell stack for producing electrical power, said method comprising:

(1) vaporizing a process fluid stream in a vaporizer to produce a vaporizer outlet outlet stream, said process fluid stream comprises methanol and water;

(2) catalytically reforming said vaporizer outlet stream in a reformer to produce a reformate stream comprising hydrogen and carbon dioxide;

(3) separating said reformate stream in a hydrogen separator into a fuel stream of substantially pure hydrogen, and a raffinate stream consisting of a hydrogen-depleted reformate stream;

(4) supplying said fuel stream and an oxidant stream to said fuel cell stack, said oxidant stream comprising oxygen from a liquid oxygen supply;

(5) circulating a heat transfer fluid to heat said vaporizer and said reformer;

(6) heating said heat transfer fluid using a catalytic burner, said burner having a quantity of catalyst disposed therein for promoting combustion of a burner fuel inlet stream with a burner oxidant inlet stream to produce heat and a burner outlet stream, said burner oxidant inlet stream comprising oxygen drawn from said liquid oxygen supply, said burner fuel inlet stream comprising said raffinate stream and methanol, and at least a portion of said burner outlet stream being recirculated through said catalytic burner;

(7) monitoring the operating temperature of said burner using a temperature sensor, and adjusting said portion of said burner outlet stream which is recirculated through said catalytic burner responsive to an output of said temperature sensor.

\* \* \* \* \*

UNITED STATES PATENT AND TRADEMARK OFFICE
CERTIFICATE OF CORRECTION

PATENT NO. : 6,063,515
DATED : May 16, 2000
INVENTOR(S) : Danny Epp, Robert Baumer Page 1 of 1

It is certified that error appears in the above-identified patent and that said Letters Patent is hereby corrected as shown below:

<u>Title page,</u>
References Cited, under OTHER PUBLICATIONS, please add the additional document that was not included on the face of the issued patent. The article information is as follows:

"VSEL Submarines Type 2495", Unknown

<u>Claims,</u>
Please correct a typographical error found in claim 1, line 4. The phrase "polymerfuel" should be two words, as shown below:

-- . . . solid polymer fuel cell . . . --

Signed and Sealed this

Nineteenth Day of March, 2002

Attest:

JAMES E. ROGAN
*Director of the United States Patent and Trademark Office*

*Attesting Officer*